United States Patent [19]

Helderman

[11] Patent Number: 4,536,115
[45] Date of Patent: Aug. 20, 1985

[54] ANCHOR APPARATUS FOR INSERTION INTO A PRE-FORMED HOLE
[76] Inventor: J. Frank Helderman, 414 S. Maple St., Graham, N.C. 27253
[21] Appl. No.: 393,668
[22] Filed: Jun. 30, 1982
[51] Int. Cl.³ .............................................. F16B 13/00
[52] U.S. Cl. ..................................... 411/17; 411/397; 411/438; 81/53.2
[58] Field of Search ..................................... 411/16–18, 411/8, 14, 39, 42, 262, 438, 397, 903; 81/53.2; 405/259-261

[56] References Cited

U.S. PATENT DOCUMENTS

| | | |
|---|---|---|
| 806,406 | 12/1905 | Farrington . |
| 906,691 | 12/1908 | Chenoweth . |
| 977,709 | 12/1910 | Craig . |
| 1,438,269 | 12/1922 | Sehrt ..................... 81/53.2 |
| 2,233,889 | 3/1941 | Hood . |
| 2,588,860 | 3/1952 | Marks . |
| 2,622,466 | 12/1952 | Vanden Bos et al. ............. 81/53.2 |
| 2,690,693 | 10/1954 | Campbell . |
| 2,837,005 | 6/1958 | Gaul . |
| 3,018,684 | 1/1962 | Brancato . |
| 3,121,453 | 2/1964 | Modrey . |
| 3,373,647 | 3/1968 | Sherock .................. 411/16 |
| 3,716,608 | 2/1973 | Neumann ................ 411/17 |
| 3,983,736 | 10/1976 | King, Jr. . |
| 4,040,326 | 8/1977 | Breed . |
| 4,182,091 | 1/1980 | Fischer ................... 411/17 |
| 4,309,135 | 1/1982 | Gutshall ................. 411/17 |

FOREIGN PATENT DOCUMENTS

| | | |
|---|---|---|
| 536820 | 4/1955 | Belgium ................. 405/261 |
| 1921753 | 11/1970 | Fed. Rep. of Germany ...... 411/903 |
| 2447232 | 8/1976 | Fed. Rep. of Germany . |
| 21113 | 5/1930 | Netherlands ........... 411/17 |
| 130823 | 2/1951 | Sweden ................. 411/17 |

OTHER PUBLICATIONS

Disclosure Agreement and drawings and copy of a description dated Oct. 9, 1972 to Ackerman–Johnson; Division Illinois Tool Works.
Brochure14 *Concrete Anchoring Will Never Be The Same* ..., U.S. Expansion Bolt Company, York, Pa. (no date shown).
*Rawl Catalog* No. 40, -The Rawlplug Company, Inc., New Rochelle, N.Y. (Copyright 1977).
Red Head Anchoring Systems–ITT Phillips Drill Division, Michigan City, Ind. (Copyright 1976).
*Red Head Anchoring Systems,* Catalog-ITT Phillips Drill Division, Michigan City, Ind. (Copyright 1980).
*The RRRRRamset Anchoring & Drilling Systems;* Ramset Fastening Systems, Winchester Avenue, New Haven, Conn., Nov. 1979.
*Red Head Concrete Fastening Systems;* ITT Phillips Drill Division, Michigan City, Ind., Jan. 1982.
*Rawl Catalog* No. 112A, The Rawlplug Company, Inc., New Rochelle, N.Y. (Copyright 1980).
*Pro Distributor & Dealer Net Price Schedule,* Jan. 1982.
*Kwik–Bolt Concrete Anchors;* McCulloch Industries, Inc., Minneapolis, Minn. (Copyright 1975).
*New Liebig Safety Bolts,* Nov. 1978.
Disclosure Document No. 103,142 of Sep. 28, 1981 filed with U.S. Patent Office.

*Primary Examiner*—Gary L. Smith
*Assistant Examiner*—Neill Wilson

[57] ABSTRACT

The disclosure herein includes an apparatus and method for positioning an anchoring device in the form of a coil in a pre-drilled hole for firmly engaging a lag screw or other member. The coil consists of a series of turns and may be made of steel or plastic or combination thereof which, in use circumferentially expands in the wall of the hole and helically elongates toward the bottom of the hole. The lag members used herewith can be removed and reinserted into the embedded coil as required. Depth indicating means is placed on the setting apparatus such as a lag screw or other tool so the anchor device or coil can be positioned to a precise depth. The anchor device or coil may be formed of a suitable diameter metallic wire or may be molded or die cast from a metal or plastic material. If molded the coil includes a thin membrane which provides stability to the coil during its storage and positioning in the hole while allowing the lag member to easily rupture the membrane for elongation and expansion of the coil during its use. A positioning tool is also included herein which allows the user to precisely and quickly position the coil into the hole whereupon once lowered to its correct depth the tool is then removed and the lag screw or other member is then inserted into the hole where it is firmly held by the anchor device.

21 Claims, 10 Drawing Figures

ANCHOR APPARATUS FOR INSERTION INTO A PRE-FORMED HOLE

BACKGROUND AND OBJECTIVES OF THE INVENTION

Anchoring device for mounting in concrete and other strata have taken on a variety of methods and configurations through the years. Oftentimes heavy machinery will have to be suspended from concrete beams or concrete block walls where conventional anchor bolts will not provide the tenacity required. Likewise, manufacturing plants have to bolt production equipment to floors to reduce vibration and to insure alignment and oftentimes a simple lag screw which is threaded into a shield inserted into a drilled hole in the floor will not provide the holding power necessary under adverse operating conditions. Thus, a multitude of anchoring devices for insertion into drilled holes have been forthcoming through the years and includes devices formed from hard and from soft pilable materials such as plastic, lead, various alloys and other compositions. Certain of the prior art devices work well under particular circumstances but oftentimes do not provide the holding power over a long period of time under extreme adverse conditions. Also, the anchoring devices which are placed into the holes for engaging a lag bolt oftentimes do not provide the holding power needed once they are in use. Also, a precise, consistant method of positioning the anchoring devices has not been developed which will allow the user a convenient exact manner for setting an anchoring device for a consistant depth and results under a variety of different requirements until now.

Conventional shields for insertion into concrete expand outwardly but not in a full 360° direction, thereby lacking full circular engagement with the wall of the hole.

With this background in mind the present invention was developed and one of its objectives is to provide an anchor device positioning tool which permits the user to "set" an anchor device in the form of a coil into a drilled hole at a precise depth for maximun gripping power.

It is yet another objective of the present invention to provide a lag screw or member having a depth indicating means for use while inserting a coil.

It is still another objective of the present invention to provide a method which will allow the user to set an anchor device or coil at the correct depth, to engage the coil with the threaded member and to then remove the lag screws or members after it has been firmly entrenched or embedded in the well.

Another objective of the invention is to provide a method for the removal of a hanger bolt from its anchored position.

It is yet another objective of the present invention to provide an anchoring device comprising a coil having a plurality of turns and having one of its end turns circumferentially extended and helically elongated.

It is still yet another objective of the present invention to provide an anchor device and method which is economical to manufacture and easy to use by unskilled or semi-skilled workers which will provide consistant, holding power and superior durability under adverse conditions in all kinds of masonry materials.

Other advantages and objectives of the invention will become readily apparent in the explanation of the invention contained below.

DESCRIPTION OF THE PREFERRED EMBODIMENTS OF THE INVENTION

The preferred method of securing an anchoring device in the form of a coil in a desired location for gripping a lag member comprises positioning an expandable coil on a coil retaining member having rotated the coil in a first clockwise direction to secure the coil to the retaining member. Next, the coil while attached to the coil retaining member is placed into a drilled hole and is lowered to a predetermined depth as indicated by a depth indicating means on the coil retaining member. As the coil is lowered into the hole the wall of the hole is scraped or scored by the coil since the coil has at least one end turn which has an outer diameter slightly greater than the diameter of the hole. When the coil has been lowered to the desired depth, the coil retaining member is rotated in a counter clockwise direction to thereby release the coil from the coil retaining member and the retaining member is then withdrawn from the hole while the coil remains positioned therein. The coil is positioned to accept a lag screw or other threadable member of suitable dimensions which will be rotatably received by the coil while the coil expands circumferentially and helically and embeds into the wall of the hole.

The expandable coil may also be positioned by the preferred form of an anchor apparatus including a shank member which includes an upper portion which is threaded, a middle shank portion having depth indicating means and a lower shank portion having lag threads. The anchor apparatus also includes a rod coupling means which, too can be threaded on the upper shank portion and a driving member which may be a hexhead bolt which may be threadably received into the rod coupling means whereby the driving member abutingly contacts the shank member. Thus, the top of the hexhead bolt or driving member provides a means for rotating the shank member.

The preferred form of the coil or anchor device of the present invention includes a helically wound cylindrical appearing member which includes an end form which is circumferentially and helically extended from the remaining turns when the coil is in its relaxed posture. The coil, being elongatable, when positioned for anchoring such as in a pre-drilled hole, expands helically and circumferentially to embed into the hole wall to provide a firm grip on a lag screw or other securing device. The anchor device or coil of the present invention may be made of metal, a plastic coated metal or other suitable material. The coil may be molded of a plastic material or die cast from metal, and would include a thin membrane along its inner portion connecting two or more turns to assist in the stabilization of the coil prior and during its initial insertion into a hole. In use, the lag threads, as they are received into the coil will rupture the membrane and allow the turns to helically and circumferentially expand.

As with the conventional wire coil, the cast or molded coil in its relaxed posture includes an end turn which is circumferentially and helically expanded relative to the remaining turns.

The present invention also includes a preferred form of a tool for positioning an anchoring device or coil which includes a handle member having a knurled upper knob or gripping means. A first shaft means is connected to the handle member which is threaded and rotatably receives a depth indicating means in the form of a machine nut. At the lower end of the first shaft means, away from the handle member is a coil groove which will receive the extended first turn of the anchoring device as previously described. Below the first shaft means is a second shaft means of a smaller diameter which assists in the stabilization of the coil as it is being lowered into a hole and the terminal portion of the second shaft means may also be useful in achieving the desired depth for the coil member as the end of the second shaft means strikes the bottom of the hole as the tool is lowered into the hole. Of course, the depth indicating means or machine nut can be rotatably raised or lowered along the first shaft means to act as a stop means when the position tool is lowered into the hole.

The preferred form of the lag member of the present invention includes a lag screw having a conventional hexhead, a smooth cylindrical portion including a means for depth indicating and a lower portion having lag threads thereon. Heat treatment may be required for the lag screw under certain conditions.

SUMMARY OF THE INVENTION

The invention as set forth here includes an ancipital anchoring apparatus which comprises either a driving member, a rod coupling means, a stop means, a shank member or other lag members such as a hexhead lag screw and an anchoring device in the form of a coil for embedment in concrete or other strata. In use, a hole is drilled in for example, a concrete floor of a size comparable to the size of the shank member or lag screw which is to be inserted. An anchoring device is threadably received on the tip of the lower shank portion of the shank member which includes lag threads and the assembled anchor apparatus is then tapped or driven into the hole to a desired depth which may be indicated on the middle shank portion. Thereafter by rotating the driving member with a wrench or otherwise the lag threads of the lower shank portion caused the coil to helically elongate downwardly and circumferentially expand outwardly whereby the shank member is spirally lowered into the hole and the coil forms a tight, firm grip on the shank member.

The driving member and rod coupling means can then be removed from the upper shank member leaving the upper threaded portion of the shank member exposed. The upper shank portion being threaded with conventional machine threads then provides a device for attaching machinery, piping or other apparatus securely to concrete strata. If a hexhead lag screw is used as the lag member it is rotated with a wrench or other conventional tool into the coil.

The coil member as referred to herein may be formed from a metal, a plastic, or combination of metal coated with a plastic substance. A Teflon coating may be applied to a metallic wire forming the coil or the threaded portion of the screw to provide lubricating properties to the coil and conventional lubricants such as petroleum oils, greases, wax, graphite or mineral lubricants may also be used. The coil may be formed from a wire such as an annealed steel by conventional wire forming methods or it may be molded or die cast from aluminum, babbitt, zinc, plastic materials, lead or other materials. In order to assist in the use of the coil one of its two end turns may be circumferentially expanded and elongated relative to the other turns to assist in starting the coil on a lag thread or positioning tool as needed. If a molded or die cast coil is formed, such coil may include a thin membrane between the turns which provides stability to the shape of the coil during its storage, shipment and initial hole insertion and said membrane is easily rupturable or tearable when receiving its corresponding lag screw member.

Also shown herein is an anchoring device positioning tool which includes a handle member, first and second shaft means, a depth stop means and a coil groove on the first shaft means. The first shaft means of the anchor device positioning tool is of a larger outer diameter than the second shaft means and provides ease to the user affixing a coil thereto.

Also provided herein is a lag member having depth indicating means thereon. The lag member of the present invention may be for example a conventional lag screw which has been marked, scored, or fitted with a sleeve or otherwise so the user can promptly determine when the lag member has reached a predetermined depth in the hole.

The anchor device of the present invention is positioned in a hole which has been drilled in concrete or other masonry material for securely holding a lag screw or other member. In use, a hole is drilled of the same dimensions as the lag screw as for example, a one-quarter inch masonry bit may be used for a one-quarter inch lag screw. After the hole is drilled to a sufficient depth the anchoring device or coil is then placed on the tip of the threads of the lag screw or it may be positioned on the tool for positioning anchoring devices and thereafter the coil is driven into the hole to the correct depth. Since the first or end turn of the coil is circumferentially expanded the expanded turn scrapes or scores the hole wall and additional force such as tapping may be required to sufficiently lower the coil. The coil is lowered as mentioned to a predetermined depth which can be precisely determined by a depth indicating means which may be in the form of a score line, threaded stop means or otherwise on the positioning tool or lag member utilized. Once the coil has been lowered to the predetermined depth it is then ready to receive lag threads of a lag screw or other member which are rotatably received by the coil. As the lag threads enter the coil the coil circumferentially expands and helically elongates thereby embedding the coil turns into the wall of the hole to form a firmly secured anchoring device fqr the lag screw or other member. The lag screw or member may be removed and reinserted as required with the coil remaining stationary in its embedded posture.

The anchoring device and method as shown herein can be classified as "ancipital" (two-headed) in that a lag member in the form of a lag screw with a hexhead can be used or a shank member such as in the form of a hanger bolt can be employed which would leave a threaded stud "head" exposed above the surface.

Also the devices and methods as shown herein are "through-set", meaning that the lag screw or other lag member used can be directly passed through a template or other device having a hole the same size as the hole in the concrete beneath it containing the anchor device, i.e., the hole in the concrete does not have to be made larger than the hole in the template which is to be held by the lag member.

DESCRIPTION OF THE DRAWINGS

Turning now the drawings.

Figure 1:
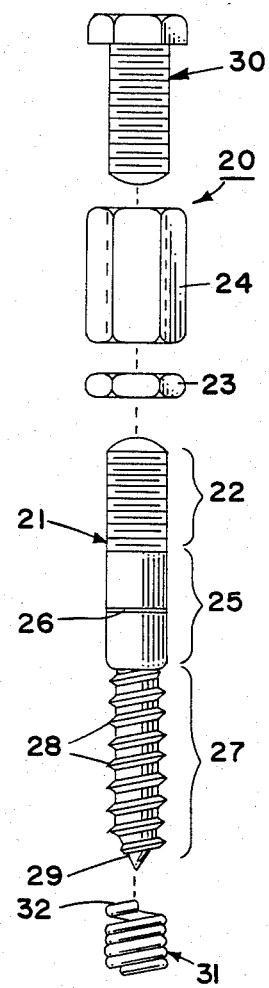
FIG. 1 demonstrates in exploded fashion anchor apparatus.

For a more detailed description of the invention, anchor apparatus 20 as shown in FIG. 1 includes a hanger bolt or shank member 21 which has a threaded upper portion 22 for threadably receiving nut means 23 and rod coupling means 24. Middle shank portion 24 includes depth indicating means 26 which consists of a thin score line surrounding middle shank portion 25 or other depth indicating means. Driving member 30 is illustrated above rod coupling means 24 and coil 31 with end turn 32 shown raised or helically extended and circumferentially expanded, relative to the remaining turns.

Figures 2, 3:
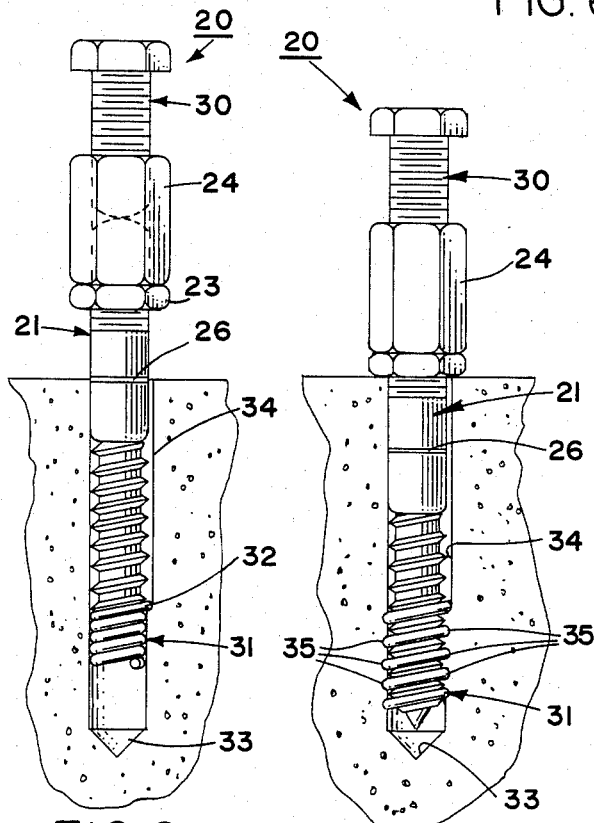
FIG. 2 demonstrates the apparatus lowered into a concrete hole.
FIG. 3 demonstrates the apparatus positioned at a deeper depth in the hole than shown in FIG. 2.

FIG. 2 illustrates the assembled anchor apparatus 20 positioned in a concrete hole and driven or tapped into the hole to the depth of indicating means 26. Apparatus 20 is correctly sunk to the proper depth by the use of depth indicating means 26 to thereby assure the user that coil 31 will have ample space below in which to helically elongate downwardly without striking hole bottom 33. Also shown in FIG. 2, end turn 32 of the coil 31 scores hole wall 34 as it is driven to its correct depth. To complete the setting of shank member 21 driving member 30 is rotated in a clockwise direction (assuming conventional right handed threads are utilized) whereby coil 31 expands circumferentially into side hole wall 34 and helically elongates towards bottom wall 34 until coil 31 has completely expanded as shank means 21 rotates and penetrates lower into the hole. By stabilizing rod coupling means 24 with a wrench or other tool, driving member 30 can then be removed. Thereafter, rod coupling 24 is likewise removed thereby exposing upper shank portion 22 of shank member 21 for threadably securing machinery or other equipment as required. Thus threaded shank 21 extends from concrete or some other substance and is firmly secured by coil 31. As shown in FIG. 3 coil 31 penetrates wall 34 and turns 35 are embedded therein to increase the holding ability of coil 31 and prevent over-torquing.

Coil 31 as shown in FIGS. 1-3 is composed of a wrapped wire member which may be cylindrical in shape. The exact composition of coil 31 may be varied for the particular material into which it is inserted. For example a steel wire may be suitable for positions in concrete whereas a soft material such as tin, lead, or malleable aluminum may be used which would be more likely candidates for embedding in certain circumstances. Coil 31 may be also formed from an annealed steel wire for dense concrete or other less porous masonry materials which are harder and denser.

Figure 10:
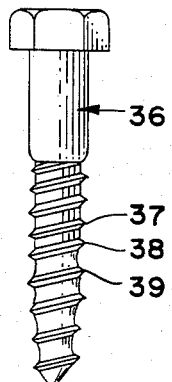
FIG. 10 demonstrates a typical lag screw which has been necked down.

It should be understood that with the use of a steel wire coil that lower shank portion 27 which is lag threaded may tend to "neck-down" or break off when being set or extracted. FIG. 10 demonstrates a lag screw 36 which has been "necked-down" and the screw stretched as one can readily determine by comparing the distances between threads 37 and 38 versus threads 38 and 39. This "necking-down" effect or stretching can be eliminated by using heat treated lag screws as explained herein.

Figure 4:
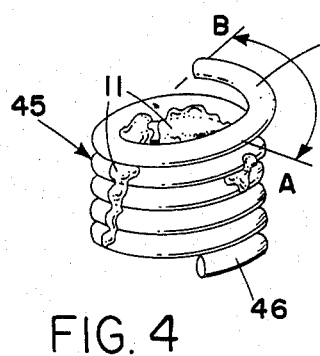
FIG. 4 illustrates a coil of the invention.
Figure 9:
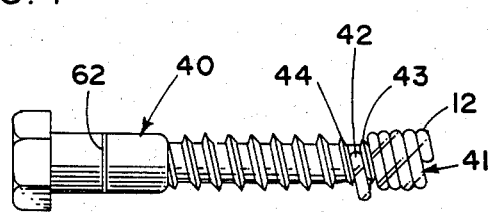
FIG. 9 shows a lag screw of the invention with the anchoring device positioned thereon.

Lubricants can be used to prevent galvanic action between the coil and the lag member and may include petroleum oils and greases 11 as shown in FIG. 4 or may include polymeric coating 12 on coil 41 as seen in FIG. 9 or on the lag threads such as Teflon or other suitable materials.

Figure 8:
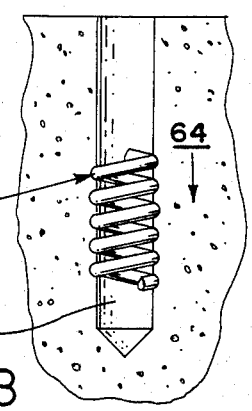
FIG. 8 shows the anchoring device as expanded and elongated by a lag screw.

In order to remove shank member 21 from embedment, nut means 23 is tightened against rod coupling means 24 after driving member 30 has been positioned within rod coupling means 24. Nut means 23 is then rotated in a counter-clockwise direction (assuming right-handed threads are employed) whereupon shank member 21 is rotatably extracted with coil 31 remaining in its elongated, set position as shown in FIG. 8.

Thereafter, if it would be desirable to reinsert shank member 21 or another lag screw of the same general dimemsions as shank member 21, this can be easily and quickly be done with confidence that coil member 31 will firmly grasp and hold reinserted shank member 21 in place.

Figure 7:
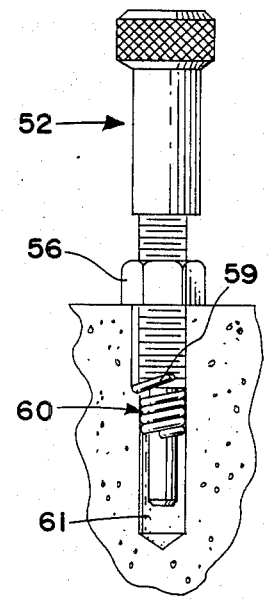
FIG. 7 illustrates the positioning tool of FIG. 6 in a concrete hole.

As shown in FIG. 9 coil 41 may be attached to and set with lag screw 40 by simply rotating extended end turn 42 of coil 41 between threads 43 and 44 of lag screw 40. As would be understood end turn 42 as shown in FIG. 9 it does not totally surround lag screw 40 but may extend approximately one-third its circumference while providing a tight grip thereto for shipment and subsequent insertion into a suitable hole if the manufacturer desires to sell lag screw 40 and coil 41 as an assembled unit. For a better view of the helical and circumferential extension of the end turn of coil 31 as shown in FIG. 1, or of coil 41 as shown in FIG. 9, FIG. 4 provides an enlarged view of one embodiment of a typical coil 45 of the present invention. Coil 45 as shown in FIG. 4 has approximately one-third of a complete turn from point A to its terminal point B. As further shown in FIG. 4 the turns of coil 45 are formed from a cylindrical, wire-like material which may be of a variety of compositions. Turn 47 as further shown in FIG. 4 is circumferentially and helically extended from the remaining turns comprising coil 45. (Circumferentially extended as used herein means that the turn 47 extends beyond the general outer diameter of coil 45 and "helically extended" means that turn 47 is raised or extended and has a greater helix angle than the helix angle of the adjacent turns). Turn 47 of coil 45, because of its helical and circumferential extension will allow for a quick, firm start on lag screw threads as shown in Figs. 2, 7, and 9. As would be understood when the accompanying lag threads are rotatably received into the coil turns, said turns are helically and circumferentially extended as shown in FIG. 3.

Figure 5:
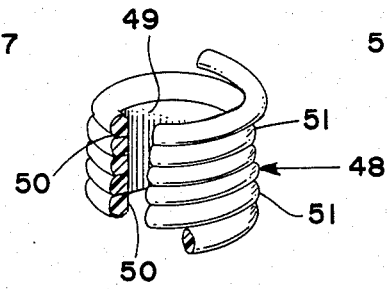
FIG. 5 illustrates a die cast or molded coil with a cut-away section.

Another embodiment of a coil member is shown in FIG. 5 where coil 48 demonstrates a coil formed from a molded or die cast material such as zinc, aluminum or as shown, a plastic material. Coil 48 may be for example injection molded and includes a slick inner wall 49 which forms a thin membrane 50 between turns 51.

Membrane 50 provides helical stability to coil 48 during storage and shipment and since membrane 50 is relatively thin, it is easily ruptured whereby turns 51 can circumferentially and helically expand as previously described during engagement with lag threads. As further shown in FIG. 5 turns 51 are shaped to accomodate practical, efficient die construction but include a flattened inner side formed by inner wall 49.

Figure 6:
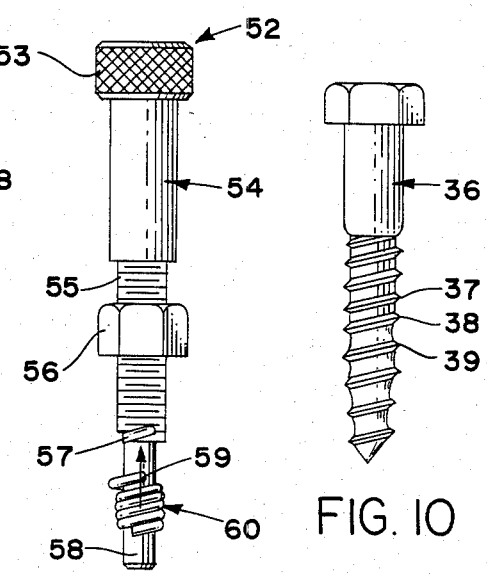
FIG. 6 shows a tool for positioning an anchor device with the anchor device positioned thereon.

As would be understood the coil like anchoring devices of the present invention can be set with an anchor setting apparatus as shown in FIGS. 1-3, a lag screw with depth indicating means as shown in FIG. 9 or with a positioning tool as shown in FIG. 6. Anchoring device positioning tool 52 includes a handle member 54 having a knurled upper knob 53, a first shaft means 55 which is shown in FIG. 6 as threaded and depth stop means 56 which as shown in FIG. 6 is a threaded nut. Coil groove 57 is shown at the lower end of first shaft means 55 for engagably receiving the extended end turn 59 of coil 60. Coil 60 is shown in FIG. 6 positioned on second shaft means 58 which has a smaller diameter than first shaft means 55. In use, coil member 60 is slid along second shaft means 58 and end turn 59 is rotated into groove 57 as shown in FIG. 6. Depth stop means 56 is then adjusted to the desired position along shaft 56 whereupon positioning tool 52 is then passed into a suitably sized hole 61 as shown in FIG. 7. Depth stop means 56 prevents the user from lowering coil 60 to an excessive depth which would prevent coil 60 from helically elongating as required when engagably receiving lag threads. After coil 60 has been lowered to the correct depth as shown in FIG. 7, positioning tool 52 is then rotated in a counter-clockwise direction whereupon end turn 59 rotatably releases from coil groove 57 and positioning tool 52 is then withdrawn from coil 61 leaving coil 60 properly positioned and available for a lag screw or hanger bolt member.

Anchoring device positioning tool 52 includes a depth stop 56 which as previously explained may be a threaded nut means 56, however, depth stop means could likewise be second shaft means 58 striking the bottom of the hole. Also, the downward thrust of anchoring device positioning tool 52 is terminated when second shaft means 58 contacts the bottom wall of the prepared hole and it is feasible to utilize the length of second shaft means 58 as a depth stop means.

Hole 63 has been drilled into a concrete substance 64 which may be for example construction cinderblock. The lag screw or other anchoring apparatus used with coil 31 has been removed and coil 31 remains in a stationary, stable position and readily available for reception of a lag screw or other connecting apparatus. As further shown in FIG. 8 coil 31 is embedded in concrete structure 34 and this embedment occurs when the lag screw or other apparatus is rotated into coil 31. The diameter of the wire forming the turns of coil 31 are greater than the thread depth of the received lag screw, hanger bolt or other member which, when threadably engaged, forces the coil turns outwardly and downwardly causing penetration of the end turns into the hole wall as shown in FIGS. 3 and 8.

If coil member 31 were composed of steel wire and if the threaded anchoring apparatus engaged therewith were of a mild steel, then upon setting of the anchoring apparatus a "necking down" effect would occur with the lag apparatus such as shown in FIG. 10 susceptible to stretching and "wringing off". This of course can be remedied by using a heat-treated steel lag screw or by using a coil formed from a softer material.

Hole 63 as shown in FIG. 8 is drilled with a bit whose nominal diameter is equal the nominal diameter of the lag screw or apparatus to be inserted. The bit should conform to the tolerance established by American National Standards Institute B94-12-77. The lag screw threads should have substantially uniform helix and flank angles and conform to standard dimensions as indicated in the "Fastener Standards" of the "Industrial Fasteners Institute" and the coils are properly sized thereto to insure a tight, firm grip regardless of the size selected for the particular job.

The coil of the present invention may be constructed of a variety of materials as previously mentioned. Annealed steel wire could be employed to form a coil or a plastic material may be used to cover a metal wire. Also, a soft aluminum or tin-antimony composition can be used or the coil may be constructed of a spring steel wire for greater hardness and for increased "breakaway" torque. However, if the user employs a coil formed from annealed steel wire or spring steel wire the greater "break-away" torque will cause the lag screws or apparatus to "neck-down" as previously discussed and therefore the lag bolt should be heat-treated to prevent necking down and stretching under such circumstances. A self-locking anchoring apparatus can be constructed by the use of a high "break-away" torque making removal of the lag member extremely difficult.

Various modifications and changes can be made to the invention without departing from its intended scope and the examples and illustrations shown herein are not intended for limiting purposes.

I claim:

1. Anchor apparatus for insertion into a pre-formed hole for permanent embedment into the walls of the hole comprising in combination: a non-resilient coil, a lag member, said lag member including a threaded portion having threads with substantially uniform helix and flank angles, said coil releasably engaging said lag member, said coil expandable from a relaxed to an elongated posture, said coil having a plurality of turns, two of said plurality of turns being oppositely positioned end turns, one of said end turns being provided with a curved lead-in end portion that comprises a portion of the turn that is helically and radially expanded relative to the other turns when said coil is in the relaxed position.

2. Anchor apparatus as claimed in claim 1 wherein said coil is constructed of a substantially cylindrical member.

3. Anchor apparatus as claimed in claim 2 wherein said cylindrical member is formed from 4. Anchor apparatus as claimed in claim 1 wherein said coil is formed from a plastic material.

5. Anchor apparatus as claimed in claim 1 and including a lubricant thereon.

6. Anchor apparatus as claimed in claim 5 wherein said lubricant comprises a polymeric coating.

7. Anchor apparatus as claimed in claim 2 wherein said cylindrical member has a diameter larger than the thread depth of said lag member.

8. Anchor apparatus as claimed in claim 1 wherein certain of said plurality of turns are contiguous in the relaxed posture.

9. Anchor apparatus as claimed in claim 1 and including a rod coupling means, said coupling means engaging said lag member, a driving member, said driving member threadably connected to said rod coupling means.

10. Anchor apparatus as claimed in claim 9 and including a nut means, said nut means threadably engaging said lag member.

11. Anchor apparatus as claimed in claim 1 wherein said lag member includes depth indicating means.

12. Anchor apparatus as claimed in claim 1 wherein said depth indicating means comprises a score line.

13. Anchor apparatus as claimed in claim 1 wherein said lag member has been heat treated.

14. Anchor apparatus as claimed in claim 1 wherein said lag member consists of a lag screw.

15. Anchor apparatus for insertion into a pre-formed hole for permanent embedment into the walls of the hole comprising in combination: a non-resilient coil, a lag member, said lag member including a threaded portion having threads with substantially uniform helix and flank angles, said coil releasably engaging said lag member, said coil having a plurality of turns, two of said plurality of turns being oppositely positioned end turns, one of said end turns being provided with a curved lead-in end portion that comprises a portion of the turn that is helically and radially expanded relative to the other turns, said coil being expandable from a relaxed to an elongated posture, a relatively thin membrane, said membrane joining at least two of said turns, said membrane being tearable upon elongation of said coil.

16. Anchor apparatus as claimed in claim 15 wherein said coil is constructed of plastic material.

17. Anchor apparatus as claimed in claim 15 wherein said turns comprise a substantially cylindrical member, said cylindrical member having a diameter larger than the thread depth of the threaded member.

18. Anchor apparatus as claimed in claim 17 wherein said cylindrical member is formed of a metal.

19. Anchor apparatus as claimed in claim 15 wherein said coil includes a lubricant.

20. Anchor apparatus as claimed in claim 19 wherein said lubricant comprises a polymeric coating.

21. Anchor apparatus as claimed in claim 15 wherein certain of said plurality of turns are contiguous in the relaxed posture.

* * * * *

UNITED STATES PATENT AND TRADEMARK OFFICE
CERTIFICATE OF CORRECTION

PATENT NO. : 4,536,115
DATED : August 20, 1985
INVENTOR(S) : Helderman

It is certified that error appears in the above-identified patent and that said Letters Patent is hereby corrected as shown below:

Column 8, line 52, in claim 3, after "from" insert --metal--.

Signed and Sealed this

Twenty-ninth Day of October 1985

[SEAL]

Attest:

DONALD J. QUIGG

Attesting Officer

Commissioner of Patents and
Trademarks—Designate